United States Patent [19]

Attinello

[11] 4,317,214
[45] Feb. 23, 1982

[54] APPARATUS FOR SIMULATING INTERFERENCE TRANSMISSIONS

[76] Inventor: John S. Attinello, 6474 Woodridge Rd., Alexandria, Va. 22312

[21] Appl. No.: 168,975

[22] Filed: Jul. 14, 1980

[51] Int. Cl.³ .................. H04B 17/00; H04K 3/00
[52] U.S. Cl. .................................. 455/1; 343/17.7; 343/18 E; 455/49; 455/67; 455/68
[58] Field of Search ........................ 455/1-4, 455/9, 49, 50, 63, 67, 68, 226; 179/175.3; 343/18 E, 17.7

[56] References Cited

U.S. PATENT DOCUMENTS 3,684,823  8/1972  McVoy ................................ 455/4
4,039,954  8/1977  den Toonder ....................... 455/1

Primary Examiner—Marc E. Bookbinder
Attorney, Agent, or Firm—Pollock, Vande Sande and Priddy

[57] ABSTRACT

A simulated interference system is provided wherein an interference signal of an interference source is simulated by a narrow band coded control signal that is transmitted from a control transmitter to a target receiver that is engaged in normal communications. The control signal is received by the target receiver and is applied to an interference injector that is coupled to the antenna of the receiver. The interference injector decodes the control signal and couples a corresponding interference signal to the antenna of the receiver. The interference signal of the interference injector operates to disrupt the normal communications signals that are received by the target receiver.

15 Claims, 3 Drawing Figures

APPARATUS FOR SIMULATING INTERFERENCE TRANSMISSIONS

DESCRIPTION

1. Technical Field

The invention relates to a system for simulating an interference transmission and, more particularly, to such a system wherein a local signal injector is employed to inject an interference signal into a receiver to simulate a transmitted interference signal.

2. Background Art

Electromagnetic communication systems may be disrupted and thereby rendered ineffective by interfering electromagnetic transmissions. Thus, it is known that powerful noise transmissions or deceptive interference transmissions may be employed to intentionally disrupt communications, for example military communications in the course of military operations. Moreover, such interference transmissions may be employed to disrupt or confuse various systems, for example radar, that operate by transmitting electromagnetic energy.

It has long been recognized that military communications systems and associated electronic equipment must be tested in a high interference environment in order to determine the effectiveness of the systems under realistic operational conditions and to train the personnel that operate the systems. Single communications devices and/or components of such devices are currently tested within electronically shielded areas. However, such areas are necessarily small and, therefore, are not adequate for realistic field testing. For interference field testing, it has heretofore been necessary to either reproduce the expected interference environment or to simulate the environment by computer modeling. The computer modeling technique is undesirable in that it does not afford an opportunity to physically test all of the equipment and personnel. However, if actual interference transmissions are employed, for example in a military training exercise, local civilian communications systems such as commercial radio, television, civilian aircraft communications and telephone microwave communications are disrupted. Thus, as a practical matter, it has heretofore been necessary to conduct physical interference field tests in isolated areas that are far removed from civilian communications equipment or in the rare instances when, by pre-arranged order, military interference testing is allowed to disrupt civilian communications for short periods of time.

A further problem in creating a realistic interference environment for military testing is that the powerful interference that is generated in such a test may easily be monitored, thereby making it difficult, if not impossible, to execute secret interference tests. Moreover, it has heretofore been very expensive to provide a sufficient number of realistic, interference generating sources to simulate an actual military interference environment, particularly, when such sources must be continuously redesigned to simulate the expected interference transmissions of others. Furthermore, since powerful interference transmissions disrupt civilian communications, it is very difficult to obtain civilian authorization to execute such tests. The above-mentioned problems make it very difficult to execute realistic interference tests in the continental United States and, if it is desired to conduct such tests in smaller, more densely populated Western European countries, the complications are multiplied.

Accordingly, it is an object of the invention to provide a relatively simple and inexpensive apparatus for realistically simulating interference transmissions.

Another object of the invention is to provide an interference simulating apparatus that affects only the communications equipment that is involved in the interference test.

A further object of the invention is to provide an interference simulating apparatus that may be operated without generating interference signals that may be easily monitored.

Another object of the invention is to provide an interference simulating apparatus that may be easily operated to realistically simulate a broad range of interference signals.

A prior art interference or jamming system is disclosed in the U.S. Pat. No. 4,039,954 to den Toonder, wherein the communications channels of subscriber drop lines in a cable television network may be electromagnetically jammed to prevent particular subscribers from observing or listening to a particular program. The system of den Toonder employs a plurality of oscillators that are located at receiver locations and that each have an associated attenuator and high frequency switch. In operation, a control signal may be decoded to operate a particular switch and to thereby apply a jamming signal of an associated oscillator to interfere with a television signal on a subscriber line.

The U.S. Pat. No. 3,684,823 to McVoy, shows another cable television system wherein a local oscillator is employed to inject an interference signal into an amplification stage of an IF receiver to interfere with a program signal that is processed by the receiver. The interfering signal of the oscillator may be selectively disabled by a control signal that is sent from a remote location.

The cited cable television interference systems are not employed to simulate an electromagnetic interference environment and, more particularly, the apparatus of the cited systems is not used to disrupt the signals of particular transmitters that transmit over a common medium.

The above-mentioned objects of the invention and the distinguishing features of the invention will become apparent from a review of the detailed specification which follows and a consideration of the accompanying drawings.

DISCLOSURE OF THE INVENTION

In order to achieve the objects of the invention and to overcome the problems of the prior art, the apparatus for simulating electromagnetic interference includes a control transmitter that generates a coded control signal that defines a particular form of electromagnetic interference. A target receiver then receives the control signal and normal communications signals and passes a portion of the received signals to an interference injector. The interference injector decodes the control signal and injects a corresponding interference signal into the target receiver.

The interference injector includes a decoder that decodes the control signal and applies the decoded signal to activate at least one interference generator. The interference generator then generates a local interference signal that is attenuated in inverse relation to the signal strength of the received control signal and the attenuated interference signal is applied to the antenna of the target receiver to interfere with the normal signals of the receiver.

A scan simulator may be employed to variably attenuate an interference signal of the signal injector in order to simulate a particular scan pattern of an interference source.

The interference injector may also be operated in conjunction with the receiver of a radar apparatus to provide delayed radar echo pulses that are injected into the radar receiver to deceptively interfere with the normal echo pulses that are monitored by the radar receiver.

BEST MODE FOR CARRYING OUT THE INVENTION

Figure 1:
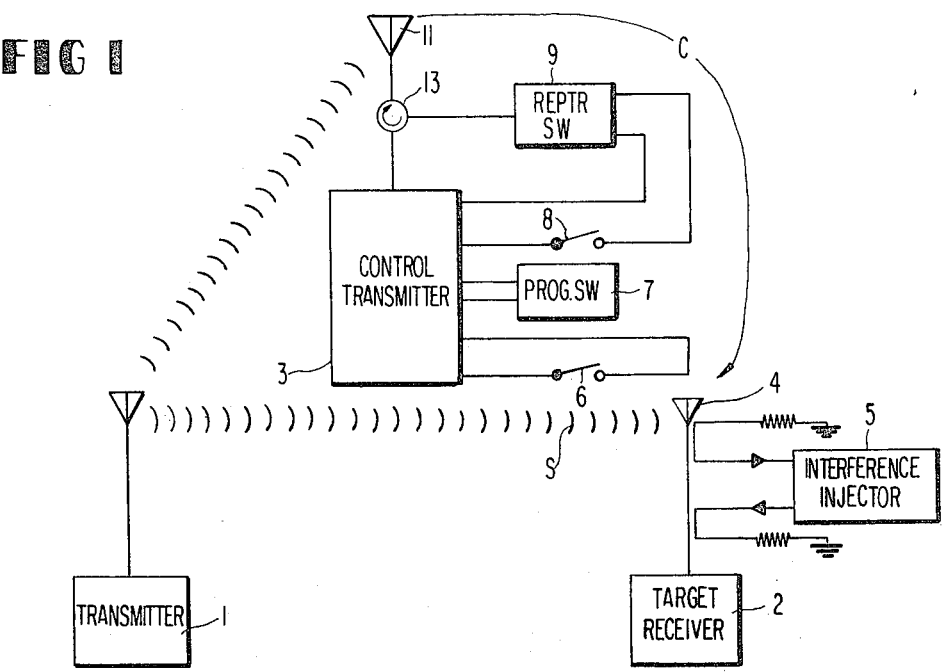
FIG. 1 shows a diagrammatic illustration of an interference system wherein interference is simulated for a transmitter/receiver communications link.

The remaining portion of this specification will describe preferred embodiments of the invention when read in conjunction with the attached drawings, in which like reference characters identify identical apparatus.

FIG. 1 shows a diagrammatic illustration of a system, in accordance with the invention, that may be employed to simulate interference over an electromagnetic communications channel between a transmitter and a receiver.

In operation, a control transmitter 3 is employed to transmit narrow band control signals C that are received at an antenna 4 of a target receiver 2 and that are passed to an interference injector 5 of the receiver. The interference injector decodes the control signal from the control transmitter 3 and generates a particular interference signal that is defined by the code and/or signal strength of the control signal. The interference signal is then coupled to the antenna 4 to interfere with the normal communications signals that are transmitted from the transmitter 1 to the target receiver 2.

It should be understood that the target receiver 2 may also operate as a transmitter and the transmitter 1 may include a receiver for receiving transmissions from the receiver 2 and an injector such as is employed for the receiver 2. Also, many transmitters and receivers with interference injectors may be used in the system of the invention and more than one control transmitter may be employed. However, for the sake of simplicity, the system of the invention is hereafter described with respect to a one-way communication between a single transmitter and a receiver and the operation of a single control transmitter.

The control transmitter 3 may be activated manually, for example by a switch 6 or intermittently by a programmed switching apparatus 7 that may include, for example, a microprocessor that operates an associated semiconductor switch. The control transmitter 3 may also be operated in a repeater mode by selecting a switch 8. In the repeater mode the transmitter 3 is turned on by a repeater switch circuit 9 if a signal having particular characteristics is transmitted within a sensing area of the transmitter. Accordingly, a signal that is transmitted in a preselected frequency range by the transmitter 1 or any other transmitter may be received by the antenna 11 of the control transmitter 3 and applied to the circuit 9 by a circulator 13, in a manner known to the art. Thereafter, the circuit 9 causes the control transmitter 3 to generate a control signal that is passed by the circulator 13 to the antenna 11 and transmitted to the receiver 2 for as long as the signal from the transmitter 1 or any other triggering transmitter is received by the control transmitter 3.

It will be appreciated by those skilled in the art that the circuit 9 may include apparatus for decoding and sensing a particular characteristic, for example frequency, of an input signal and for operating an electronic switch, such as a silicon controlled rectifier to apply power to the control transmitter 3 if a particular signal characteristic is detected.

Figure 2:
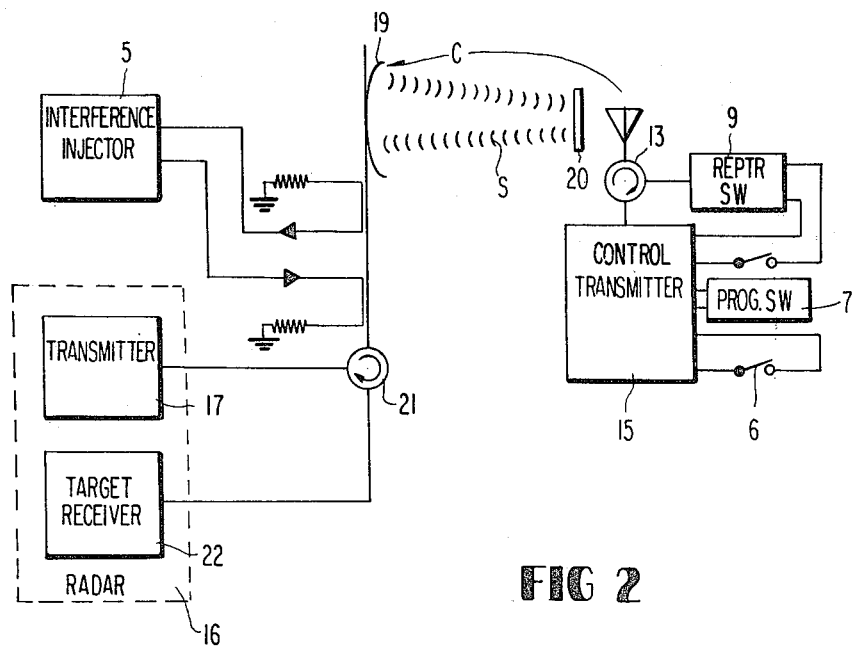
FIG. 2 shows a diagrammatic illustration of an interference system wherein interference is simulated for a radar unit.

FIG. 2 shows a diagrammatic illustration of an interference test system for interfering with the operation of a radar unit 16. As is known to those skilled in the art, the radar unit 16 includes a transmitter 17 that generates a steam of electromagnetic pulses that are passed to a scanning radar antenna 19 by a circulator 21. For normal operation, the pulses are transmitted from the scanning antenna 19 and are reflected from a target object 20. The reflected echo pulses are received by the antenna 19 and are passed to a receiver 22 by the circulator 21. The time delay between a transmitted and a received pulse is used to register the distance between the transmitter 17 and the target object.

In known interference systems, noise or other interference transmissions may be applied to disrupt the echo pulses of a radar unit. Alternatively, a deceptive interference technique may be employed to transmit a false echo pulse to the receiver of a radar unit so that the radar unit registers an erroneous distance measurement.

The above-described radar interference techniques may be simulated by the apparatus of the invention in the system illustrated in FIG. 2. In operation, a control transmitter 15 transmits a coded control signal that activates an interference injector 5 of the radar unit 16 and thereby causes either a disruptive or deceptive interference signal to be injected into the radar receiver 22.

It should be understood that the control transmitter 15 may be operated to continuously or intermittently transmit a control signal that will activate the interference injector of any radar receiver that receives the signal. As a practical matter, the strength of the control signal is a function of the relative positions of the transmitting and receiving antennas. Thus, if the scanning antenna 19 of the radar unit 16 is relatively far from the antenna of the control transmitter 15, the control signal will probably be received and injected at the receiver 22 only when the antenna 19 is facing in the general direction of the antenna of the control transmitter. However, if the antenna 19 of the radar unit is relatively close to the antenna of the control transmitter, the antenna 19 may receive control signals even if it does not face the antenna of the control transmitter.

As explained above, a control transmitter may be operated in a repeater mode to transmit coded control signals only when a transmission is received. For the system of FIG. 2, the control transmitter 15 may be operated to send interference control signals only when radar pulses are received from the radar unit 16.

Thus, target receivers that have interference injectors and that operate within transmission range of a control transmitter will receive control signals and normal transmission signals and will also receive injected interference signals that are defined by the control signals. Accordingly, in the system of the invention, the control signals produce interference effects only in target receivers that have associated interference injectors, while receivers that operate without such interference injectors, for example civilian receivers or the receivers of test or training monitoring personnel, are not affected by the interference control signals.

In general, the control signals of a control transmitter may be transmitted at a power level that is substantially below the power level of the interference signal that is simulated. Also, the narrow frequency band of the control signals may be selected so as to avoid interference with normal communications signals and, if possible, the control frequency band may be selected within the frequency band of the interference signals that are simulated. Moreover, the control transmitter may be preferably positioned at the location at which an interference transmitter would be placed to transmit actual interference signals and the electrical and other operational characteristics of the antenna for the control transmitter may be selected to match the characteristics of the antenna of an actual interference transmitter, or the characteristics may be simulated by a particular coding of the control signals.

It will be appreciated by those skilled in the art that if a control transmitter is located at the same position as would be provided for an actual interference source and the frequency of the control signals is similar to the frequency of the interference signals that are simulated, the propagation characteristics of the control signals will match the propagation characteristics of the simulated interference signals. Accordingly, the effect of shielding structures in the local terrain will be the same for the control signals as for comparable interference signals, thereby enhancing the realism of the interference simulation.

For maximum realism in an interference simulation system, the electrical and scanning characteristics of a simulated interference antenna may be duplicated by the antenna of the corresponding control transmitter. However, for economic or other practical reasons it may not be possible to physically duplicate the scanning characteristics or electrical characteristics of a particular interference antenna. Accordingly, as indicated above, the control signal of a control transmitter may be coded to simulate the scanning characteristics and/or the electrical characteristics of the actual interference antenna.

Thus, for example, if an actual interference antenna is rotated to provide interference electromagnetic signals that vary in amplitude over time, the control signals of the corresponding control transmitter may be electronically attenuated over time to duplicate the effect of the scanning operation of the interference antenna. Alternatively, an interference injector of a target receiver may include apparatus for variably attenuating an injected interference signal to simulate the scanning characteristics of an interference source.

Figure 3:
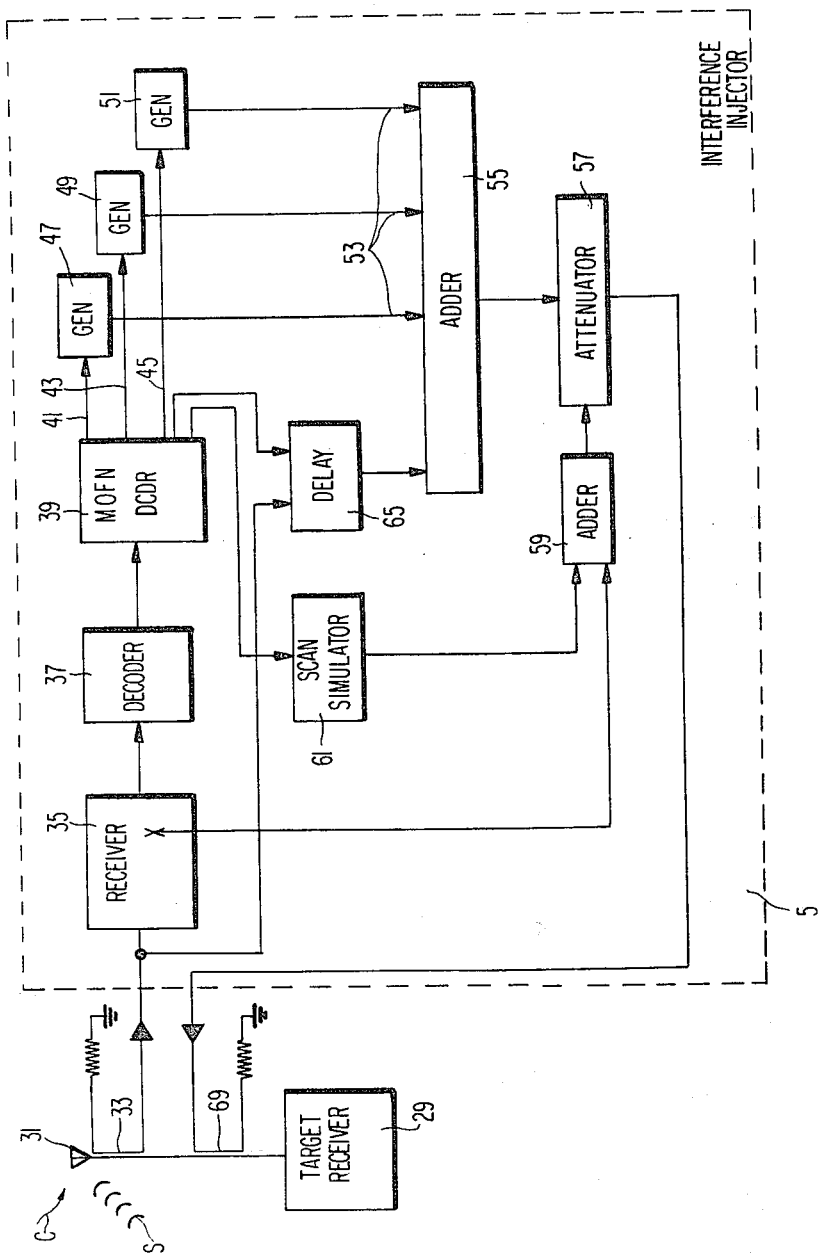
FIG. 3 shows a block diagram of a preferred embodiment of an interference injector, in accordance with the invention.

FIG. 3 illustrates a block diagram of an interference injector that may be employed in either of the systems described for FIGS. 1 and 2 to achieve the objects of the invention. As explained above, the interference injector 5 operates to inject an interference signal into a receiver 29 that may be a component of a radar unit or that may be employed for any other communication purpose. An antenna 31 of the receiver 29 receives normal signals S from a communicating transmitter and control signals C from a control transmitter. Of course, the antenna 31 will also receive background noise transmissions and other normal background interference signals. However, for the sake of simplicity, the operation of the apparatus of the invention will hereafter be described with respect to control signals C and normal communication signals S.

A small signal portion of the control signals C and normal communication signals S may be coupled from the antenna 31 to the interference injector 5 in any manner known to the art. For a preferred embodiment of the invention, the coupling of the small injector input signal is achieved by a directional coupler 33. In general, it should be understood that the coupled injector input signal losses should be as small as possible so that the input signals of the receiver 29 are not unduly attenuated. However, if necessary, an amplifier (not shown) may be connected at the front end of the receiver 29 to amplify the input signals and thereby compensate for the attenuating effect of the coupler 33.

The control signals C may carry control information in any manner known to the art. In a preferred embodiment of the invention the control signals are narrow band radio frequency carriers that are modulated in accordance with a multi-frequency code, such as is employed in the art under the trademark TOUCH-TONE. Such signals may be generated at a control transmitter by activating, for example, a dual-tone multiple frequency pad to modulate a radio frequency carrier that is then transmitted to target receivers and associated interference injectors in the transmitting area of the control transmitter. Of course, a target receiver will receive the control signals if the receiver is in range of the control transmitter and if intermediate objects in the local terrain do not block the control signals.

The signal of the directional coupler 33 is applied to a receiver 35 of the interference injector 5. The receiver 35 may be a typical radio receiver having a narrow band front end filter that passes only the radio frequency control signal. The receiver 35 may operate in a manner known to the art to generate a multiple frequency tone signal from the RF carrier and to apply the tone signal to a decoder 37. The decoder 37 may be programmed so that a particular digital code is generated for each unique multi-frequency tone input. Such programmable decoders are known to the art and are commercially available.

The digital output of the decoder 37 is applied to an M of N decoder 39. The decoder 39 has a plurality of inputs for receiving the digital code from the decoder 37 and has a plurality of output control lines 41, 43, 45, each of which is activated in response to a particular input digital code. The control lines 41, 43 and 45 of the decoder 39 are applied to control corresponding interference generators 47, 49 and 51.

Each of the interference generators is employed to generate a particular associated interference signal when its control line from the decoder 39 is energized. It will be understood by those skilled in the art that many different types of interference signals may be employed. For example, generators are commercially available to generate white noise, pseudo-random interference pulses, sawtooth or comb interference signals or any other interference signal that is intended to disrupt a communications signal. Thus, for example, the interference generator 47 may be employed to generate white noise, the interference generator 49 may be employed to generate pseudo-random interference pulses and the interference generator 51 may be used to generate a sawtooth or comb interference signal. However, it should be understood that, although particular examples of interference generators have been suggested, other types of known interference generators may be used. In addition, although three interference generators are shown in FIG. 3, it should be understood that either more or less generators may be used, without departing from the spirit of the invention.

The apparatus that may be employed to activate each interference generator in response to an energized control line has not been described in detail, since such apparatus is well-known to the art. In general, it should be understood that if the control line of each interference generator is employed to turn on the generator, a transistor or other solid state switch may be employed to connect power to the interference generator in response to an applied activation signal from an energized control line. Alternatively, the interference generators may be maintained in an on condition and the control lines of the decoder 39 and associated switches, for example transistors, may be employed to apply the outputs of particular interference generators to generator output lines 53.

The interference signal or signals on the generator output lines 53 are applied to an adder 55, for example a resistive network, that combines any interference signals on the lines 53 and applies a corresponding combined signal to an attenuator 57. The attenuator 57 operates to attenuate the input combined signal by an amount that is defined by an output attenuation control voltage of an adder 59. More particularly, the attenuator operates to increase attenuation and thereby decrease the amplitude of the combined signal as the amplitude of the attenuation control voltage at the output of the adder 55 is decreased. Likewise, the attenuation is decreased and the amplitude of the combined signal is increased as the amplitude of the attenuation control voltage is increased. Voltage controlled attenuators such as the attenuator 57 of FIG. 3 are well-known in the art and are commercially available.

The attenuation control voltage at the output of the adder 59 is defined by an input range signal from an automatic gain control (AGC) node X of the radio receiver 35 and a scan simulator voltage that is generated at the output of a scan simulator 61.

The AGC voltage of the radio receiver 35 corresponds to the amplitude of the control signal that is received by the receiver 35. It should be understood that if the target receiver 29 and associated interference injector 5 are located in proximity to a control transmitter that generates a control signal C, the AGC signal will be relatively large in order to provide a decreased gain for the receiver 35. Likewise, if the target receiver 29 and associated interference injector 5 are located further away from the control transmitter, the control signals C that are received by the receiver 35 will be more attenuated and, therefore, the AGC voltage will be reduced in order to increase the gain of the receiver 35. Thus, the magnitude of the AGC voltage indicates the distance or range of the target receiver 29 with respect to a control transmitter. Accordingly, if a control tranmitter is relatively close to the target receiver 29, a relatively large interference signal will be injected into the receiver 29 and, as the distance between the control transmitter and target receiver 29 increases, smaller interference signals will be injected into the receiver 29.

It should be understood that the receiver AGC is employed to control the attenuation of the injected signal so that the strength of the injected signal is dependent upon such factors as the geometry of the transmission system, the distance between the control transmitter and the receiver and the effects of the terrain on the control signal. However, although the receiver AGC provides an effective means for attenuating the injected signal in a preferred embodiment of the invention, other attenuation methods may be employed to control the attenuation of the injected signals as some function of the received signal, without departing from the invention. In many cases the attenuation of the injected signal may be appropriately made proportional to the logarithm of the received signal level. Thus, for example, a logarithmic receiver may be used instead of the AGC to provide an attenuated injected signal or an AGC circuit may be employed to approximate a log response.

The scan simulator 61 may be, for example, a variable voltage source that is controlled by the decoder 39 to generate a voltage that changes in amplitude in accordance with a simulated scanning pattern for an interference source. It should be understood that as the output voltage of the scan simulator 61 changes in accordance with a particular scan pattern, the output voltage of the adder 59 will likewise change and the interference signal at the output of the attenuator 57 will be attenuated accordingly. Thus, an interference signal from the interference generators 47, 49 and 51 may be attenuated in accordance with the signal strength of the control signals received at a target receiver and the antenna scanning pattern of an interference source that is simulated. The attenuated interference signal is then coupled to the antenna 31, for example by a directional coupler 69, so that the receiver 29 receives the input signals C and S and the interference signal from the interference injector.

As indicated above, the control transmitter itself may have an antenna that scans in a pattern that is the same as the scanning pattern of the antenna of the interference source that is simulated. If such is the case, the scan simulator 61 is not required, since the scan simulation is provided at the control transmitter. If it is not possible to scan the antenna of the control transmitter in a particular pattern, the scanning pattern may also be simulated by utilizing a controlled attenuator at the control transmitter to attenuate the transmitted control signal of the transmitter over time in accordance with a particular simulated scanning pattern. Of course, if the scan pattern attenuation is performed in such a fashion at the control transmitter, the scan simulator 61 will not be required at an interference injector.

If the receiver 29 is a receiver for a radar unit, for example as shown in FIG. 2, the interference injector 5 may be operated to generate a deceptive echo radar pulse, as described for FIG. 2. More particularly, in the embodiment of FIG. 3, if the target receiver 29 is the receiver of a radar unit, the signals S are echo radar pulses that have been reflected from a target and the signals C are the control signals that are generated by a control transmitter and received by the interference injector of the radar receiver. In operation, the reflected radar pulses S and the associated control signals C are coupled by the directional coupler 33 to the interface injector 5 in the manner described above and the receiver 35 and decoder 37 operate as described above to generate a digital code signal corresponding to the frequency code of the control signal C. The coupled C and S signals are also passed to a delay line 65 that delays the signals in time in a manner known to the art. An amplifier (not shown) may be provided at the output of the delay line 65 to amplify the delayed signals. The amplification of the delayed signals and/or the time delay of the delay line 65 may be varied in a predetermined pattern over time in a manner known to the art to simulate more complex types of radar interference signals. The delayed signals are passed to the adder 55 and, thereafter, the delayed signals are attenuated by the attenuator 57 in the above-described manner and are coupled to the antenna 31 of the receiver 29 by the directional coupler 69.

The delayed signals are applied to the receiver 29 by the interference injector 5 to provide deceptive echo pulses that will render the range or other parameter determination of the associated radar unit erroneous. The interference injector 5 may also be operated to inject interference signals from the generators 47, 49 and 51 to disrupt the echo radar pulses that are received by the radar receiver. Thus, the interference injector 5 couples an interference signal to the antenna of a target receiver, in accordance with an input control signal that identifies the type of interference signal that is to be injected and the range attenuation and/or scan pattern attenuation that is to be applied to simulate a particular interference signal. It will be appreciated by those skilled in the art that, by employing known techniques, the echo signals S may be distorted in many ways to provide injected signals that will interfere with the proper operation of a radar unit. Accordingly, although particular examples of signal distortion have been provided for the preferred embodiment of the invention, other known methods of signal distortion may be employed, without departing from the invention. Such known interference techniques are shown, for example, in the reference by Stephen L. Johnston, "Radar Electronic Countermeasures", ARTECH House (1979).

Although the preferred embodiment of FIG. 3 has been described with respect to an interference injector that applies an interference signal to the antenna of a target receiver 29, it should be appreciated that the interference signal may also be injected at any point in the receiver 29. For example, an interference signal may be injected at any particular stage of amplification of the receiver 29 to produce the interference effect. However, it is preferred to inject the interference signal at the antenna of the target receiver in order to simulate interference in the most realistic fashion. Also, if an interference signal is injected at the antenna of a receiver, it is easy to convert an ordinary receiver for use in the interference injection system, since all that is required is to couple an interference injector to an antenna of the receiver, thereby avoiding any alterations in the circuitry of the receiver and likewise diminishing the cost of converting the receiver to an interference simulating receiver.

It should be appreciated that by the interference signal injection method of the invention, interference signals in the milliwatt range may be injected into a receiver to simulate the interference that would be caused by an actual interference transmission of many kilowatts. Accordingly, not only does the apparatus of the invention avoid the problems associated with transmitting powerful interference signals in a test situation, but also the system of the invention is energy-efficient and, therefore, is less expensive to operate than a system that employs actual high-power interference sources to cause interference. Moreover, it should be understood that the system of the invention utilizes a narrow band control signal to trigger local interference injectors and, therefore, a military training exercise may be carried out in secrecy, since the coded control signals cannot be easily monitored or decoded by unauthorized parties. Also, the narrow frequency band and relatively low power of the control signals ensures that civilian communications will not be disrupted during interference testing.

Although the system of the invention has been described with respect to a multi-frequency tone control signal, it should be appreciated that any type of control signal may be used without departing from the spirit of the invention. Also, although particular types of injected interference signals have been described, many types of known interference signals may be used, without departing from the invention. Moreover, it is anticipated that control transmitters may be positioned at ground, air, sea or space transmitting locations to transmit control signals for simulating particular kinds of interference. Of course, in order to maintain the realism of the test, it is anticipated that such positions will be defined in accordance with the expected positions of actual interference generators, although it should be understood that the invention is not limited to a particular positioning of any control transmitters.

Although the preferred embodiment of FIG. 3 has been described with respect to particular components that may be utilized to achieve the functions of the invention, it should be understood that other components may be used, without departing from the spirit of the invention. Thus, the description of the preferred embodiment of FIG. 3 is provided for illustrative purposes only and is not intended to be limiting with respect to the components of an interference injector or a particular operation of an injector. For example, although the preferred embodiment of FIG. 3 has been described with respect to an apparatus wherein a scanning pattern, a range and a particular type of interference are simulated, other control and/or simulation features may be added to simulate additional features or characteristics of an interference transmitter, without departing from the invention.

Also, it should be understood that the invention is not limited to a particular type of decoded control signal or to a particular relation of the decoded control signal to control functions. Thus, although a digital decoded control signal is described, other types of signals, for example analog voltage signals, may be utilized to provide the described control functions of the invention or other control functions within the scope of the invention.

It should be further appreciated that the interference generators 47, 49 and 51 may be controlled in accordance with a continuously received control signal or may be turned on by a control signal of a particular code and turned off by a control signal of another code. Also, more than one of the interference generators may be turned on at the same time to provide a combined interference signal having particular desired interference characteristics. Moreover, the invention is not limited to particular types of interference generators and, also, it is not necessary that all of the interference injectors of the system of the invention operate in the same fashion or employ the same internal components.

Although the system of the invention has been described with respect to a control signal that has a frequency that is the same as or approximately equal to the frequency of a simulated interference signal, it should be understood that the frequency of the control signal may be substantially different from the frequency of the corresponding simulated interference signal, without departing from the invention. However, it is anticipated that the greatest realism in terms of simulating interference signals will be achieved if control signals are transmitted at a frequency that is close to the frequency of the simulated interference signals.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

INDUSTRIAL APPLICABILITY

The interference system and apparatus of the invention may be employed to realistically and relatively inexpensively simulate an interference environment for the interference testing of communications equipment, for example radio or radar receivers.

I claim:

1. In a communication system of a type wherein at least one test transmitter emits test communication signals to communicate with at least one target test receiver over a transmission medium and other nontest transmitters emit nontest communication signals to communicate with nontest receivers over said transmission medium, the improvement of an interference simulating system for interfering only with the test communications signals, the interference simulating system comprising:
   control means for transmitting control signals that do not interfere with the test and nontest communication signals, the control signals transmitted over said transmission medium to define corresponding interference signals; and
   injector means operatively associated with said at least one target test receiver for receiving said control signals and for generating interference signals defined by the control signals and for applying the interference signals to said at least one target test receiver to interfere with at least the test communication signals that are received by the target test receiver.

2. The interference simulating system of claim 1 wherein said control means includes means for transmitting control signals having a bandwidth that is narrow in comparison to the bandwidth of said test and nontest communication signals.

3. The interference simulating system of claim 1 wherein said control means includes means for transmitting control signals having a frequency that is approximately the same as the frequency of the defined interference signals.

4. The interference simulating system of claim 1 including switch means for manually activating said control means to transmit said control signals.

5. The interference simulating system of claim 1 including programmed switch means for activating said control means to transmit said control signals in a programmed sequence.

6. The interference simulating system of claim 1 including repeater switch means responsive to a test communications signal for activating said control means to transmit said control signals.

7. The interference simulating system of claim 1 wherein said control means includes means for generating a control signal modulated in accordance with a multifrequency coded tone.

8. The interference simulating system of claim 1 wherein said injector means includes,
   means for receiving at least a portion of said control signals,
   a plurality of generators for generating interference signals, and
   means for decoding the received control signals and activating at least one of the generators to generate selected interference signals.

9. The interference simulating system of claim 8 wherein said injector means includes range simulation means for attenuating said selected interference signals in inverse relation to the relative magnitude of the control signals that are received by the injector means.

10. The interference simulating system of claim 8 wherein said injector means includes pattern attenuation means for variably attenuating said selected interference signals in accordance with a predetermined antenna scanning pattern.

11. The interference simulating system of claim 1 wherein said injector means includes delay means responsive to at least a portion of said control signals for delaying at least a portion of the test communication signals received by said at least one target test receiver and for applying the delayed signals to the target test receiver.

12. The interference simulating system of claim 1 wherein said injector means includes means responsive to at least a portion of said control signals for distorting at least a portion of the test communication signals received by said at least one target test receiver and for applying the distorted signals to the target test receiver.

13. The interference simulating system of claim 11 wherein said at least one test transmitter includes means for emitting test communication signals for a radar apparatus and said at least one target test receiver includes means for receiving the test communication signals of said test transmitter that are reflected from a target object.

14. The interference simulating system of claim 1 including,
   an antenna for receiving said test communication signals and said control signals,
   a first coupling means for applying at least a portion of the control signals and at least a portion of the test communication signals to said injector means, and
   a second coupling means for applying the interference signals of said injector means to said antenna.

15. The interference simulating system of claim 14 wherein said first and second coupling means are directional couplers.

\* \* \* \* \*